Aug. 5, 1941.    J. H. RAND, JR    2,251,577
ELECTRIC RAZOR
Filed July 22, 1938    2 Sheets-Sheet 1
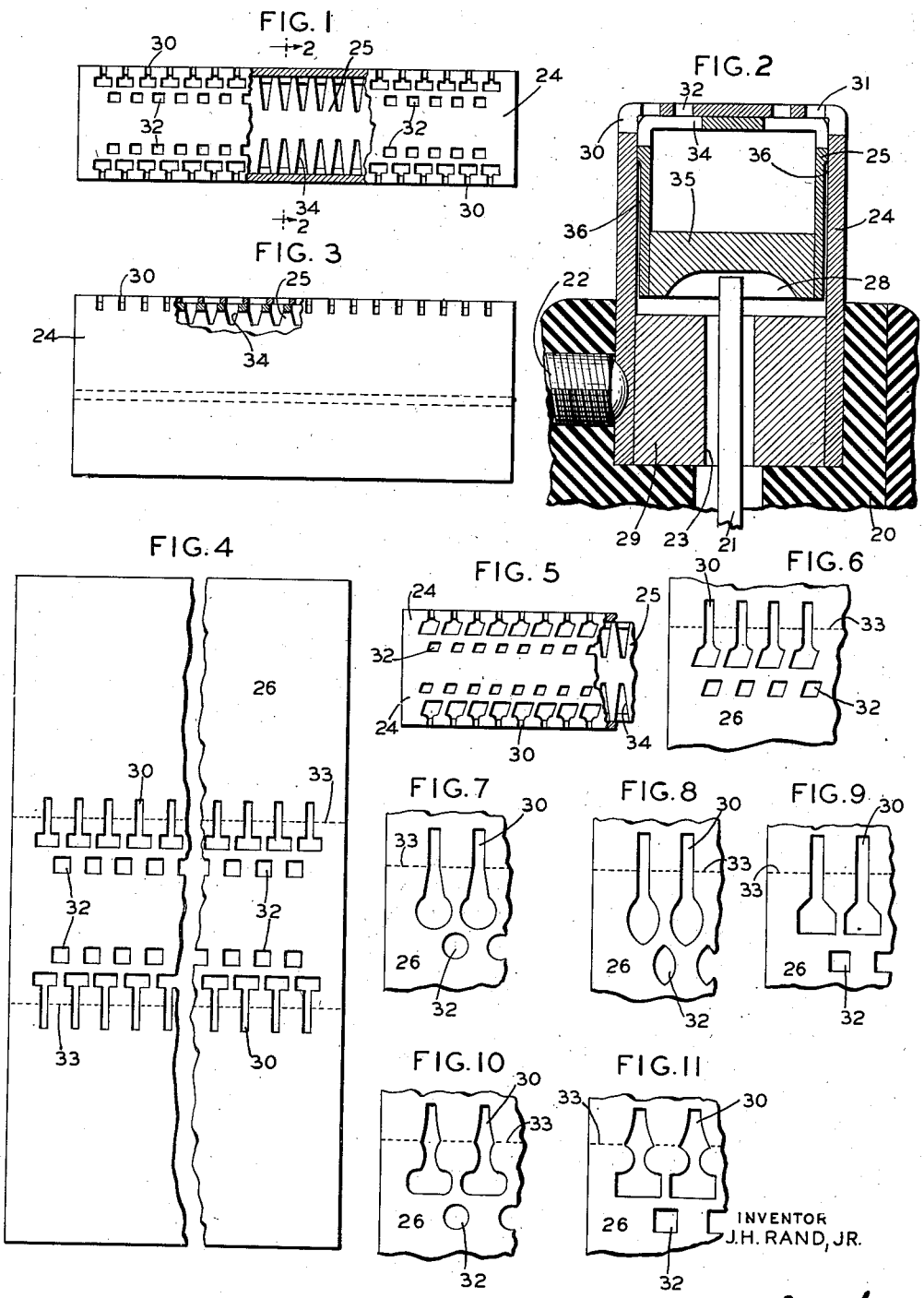

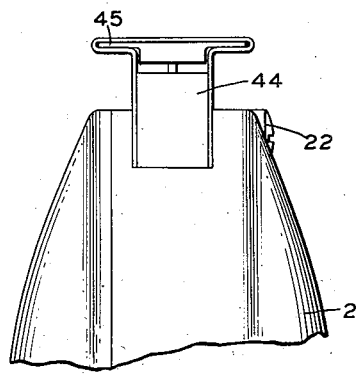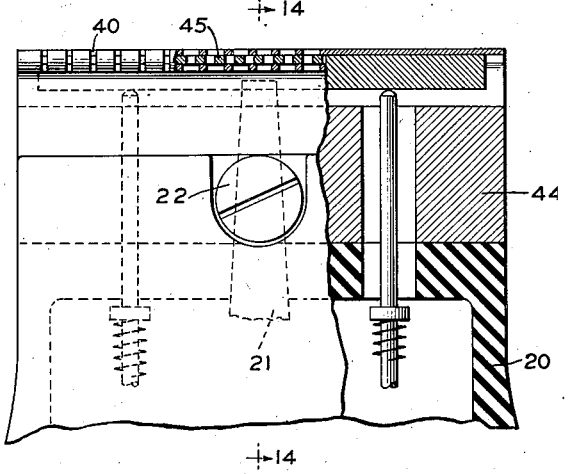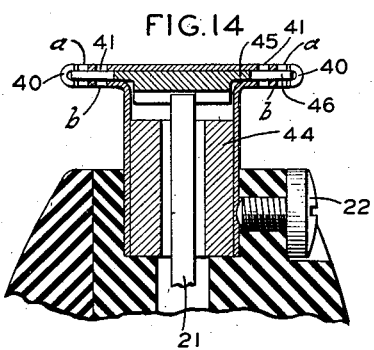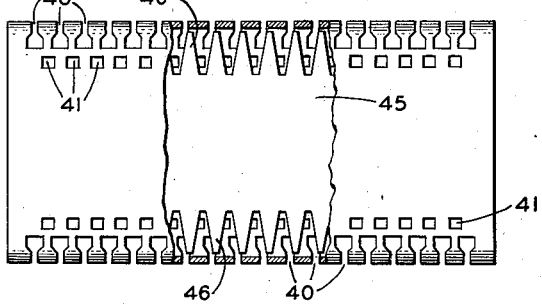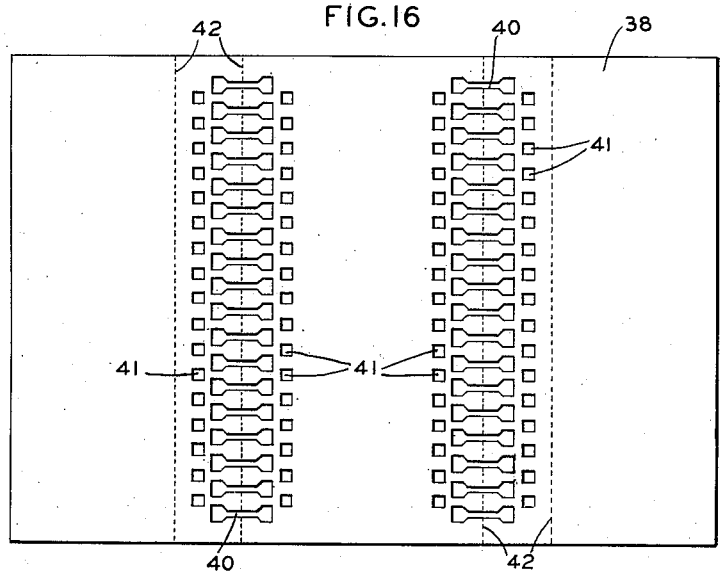

Patented Aug. 5, 1941

2,251,577

UNITED STATES PATENT OFFICE 2,251,577

ELECTRIC RAZOR

James H. Rand, Jr., Stamford, Conn., assignor to Remington Rand Inc., Buffalo, N. Y., a corporation of Delaware Application July 22, 1938, Serial No. 220,628

6 Claims. (Cl. 30—43)

This invention relates to shearing heads for electric razors, and more particularly to improvements in the formation of the shearing members.

This type of shearing head is adapted for use in razors similar to that disclosed and described in the patent application of R. E. Benner, S. N. 178,464, filed December 7, 1937.

It is a well known disadvantage in the shearing heads of this type, that where slots are provided for shearing long hair, or for combing the shorter hair into engagement with the shearing members, it is usually difficult to prevent the skin from forming wrinkles which enter the slots and are there cut by the inner cutter. This is particularly true of that type of shearing head having slots extending across both the inner and outer cutters.

It is, therefore, the principal object of this invention to provide an outer cutter in which perforations of various shapes are combined with combing slots for conducting the hair into engagement with the shear members.

Another object is to provide a shearing head in which the use of a combination of slots and perforations will prevent the skin from becoming ridged and thus entering the slots where it will be cut.

A further object is to provide an outer cutter which may be preformed in sheet metal, and then bent to the desired shape.

Another object is to provide a shearing head which will be efficient in operation and economical to manufacture.

A more clear conception of the construction, operation, and further objects of the invention may be had from the following specification when taken in conjunction with the accompanying drawings, in which Fig. 1 is a plan view of the preferred form of shearing head with parts broken away to disclose the inner cutting member;

Fig. 2 is an enlarged cross section taken along line 2—2 of Fig. 1 and including a portion of a razor;

Fig. 3 is a side view of Fig. 1 with parts broken away;

Fig. 4 is a developed view of the blank used in forming an outer cutter member;

Fig. 5 is a fragmentary plan view of a modified form of an embodiment of my invention, with parts broken away to disclose the inner shearing member;

Fig. 6 is an enlarged developed view of a portion of the blank used in forming the outer cutter of Fig. 5;

Figs. 7 to 11, inclusive, are views substantially like that of Fig. 6 showing several modified slots and perforations;

Fig. 12 is an end elevational view of a modified emobdiment of this invention;

Fig. 13 is an enlarged side elevation of Fig. 12, with parts broken away;

Fig. 14 is a cross sectional view, taken substantially along line 14—14 of Fig. 13;

Fig. 15 is a plan view of the shearing head with parts broken away to disclose the inner cutting member;

Fig. 16 is a developed view of a portion of the blank used in forming the outer cutter of Fig. 15.

Like characters of reference refer to like parts in all the figures.

A shearing head of this type is removably secured to a handle or motor casing 20 by a screw 22. In the casing is a motor (not shown) adapted to oscillate a lever 21 which extends through a slot 23 in the base 29 of the outer cutter 24 to engage a slot 28 in the base of inner cutter 25.

The inner and outer cutters are substantially rectangular, being formed of sheet metal bent to shape and secured to a block of metal forming a base. Before being bent to shape the cutting edges are formed by any suitable means such as perforating, stamping, or cutting.

In Fig. 4 the preferred form of outer cutter is shown developed in the form of a blank 26 in which T shaped slots 30 and square perforations 32 have been preformed. After having been preformed the blank is bent on the dotted lines 33 and secured by any well known means, such as welding, to the base 29 to form the outer cutter of Figs. 1, 2, and 3. It will be noted that in bending the blank 26, the square perforations 32, and the enlarged or cross bar portion, and a portion of neck of slots 30, are located in the upper portion or face of the cutter, while the remainder of the neck extends down the side. The edges of the cross bar and the perforations form shearing edges which cooperate with the shearing edges of the inner cutter 25.

The inner cutter is formed of a sheet metal blank which is bent to the shape shown in Fig. 2, and then V shaped slots 34 are ground in the corners to form shearing edges in the top surface and combing means in the sides of the cutter. As in the outer cutter, the sheet metal blank is secured to a base 35. After being secured to the base the sides 36 are ground as shown in Fig. 2 to reduce the friction between the cutters.

In operation, the lower portions of slots 30 are adapted to engage and comb long hairs into the cross or enlarged portion of the slot, where they are cut by the shearing edges of slots 30, and 34. The perforations 32 are adapted to receive short hairs which are cut by the shearing edges of the perforation and the edges of slots 34.

It is obvious that a cutter of this type, formed of thin sheet metal, will provide a very thin shearing member of great strength, and due to the use of perforations in place of the usual slots for forming shearing edges, the cutter will be very rigid.

Modified forms of perforations and slots for use in an outer cutter are shown in Figs. 5-11, inclusive. The inner cutter 25 is the same in all cases. As in the form above described, the narrow portions of the slots are adapted to comb the hair into the enlarged portion where it is cut.

In Fig. 16 a modified form of the outer cutter is shown developed in the form of a blank 38, in which slots 40 are formed with wider portions at each end thereof. Square perforations 41 are adjacent each end of slots 40. After having been preformed the blank is bent on the dotted lines 42, and secured to base 44 to form the outer cutter of Figs. 12, 13, 14, and 15. In bending the blank 38, looped flanges are formed on each side of the outer cutter, so that the narrow portions of the slots 40 underlie each other and are located on the edge of said in-turned flanges. The blank is so bent that the wider portions of slot 40 and perforations 41 are in perfect registry with one another. As a result of bending the blank in the manner described so as to form the inturned flanges indicated by letters a and b, slots 40 in effect change from the form disclosed in the blank to slots having a narrow outer neck with an inner wider body.

The inner cutter comprises a flat blade member 45 having a thicker center portion and having teeth 46 thereon. The inner cutter is reciprocated by the arm 21 in the same manner as that in Figs. 1 and 2.

When a razor having a cutter of the above type is drawn over the face the hair entering the slots 40 is cut short by the blades of the inner cutter. Short hair then enters the perforations 41 where it is again cut.

While I have described what I consider to be highly desirable embodiments of my invention, it is obvious that many changes in form could be made without departing from the spirit of my invention, and I, therefore, do not limit myself, to the exact form herein shown and described, nor to anything less than the whole of my invention as hereinbefore set forth, and as hereinafter claimed.

What I claim as new and desire to secure by Letters Patent is:

1. In a head for dry shavers, the combination of an outer shearing member having a longitudinal front portion and a longitudinal side wall portion adjacent thereto, an inner cutter mounted for longitudinal movement within said outer shearing member and having an outer surface shaped to engage the inner surface of both the front and side wall portions of said outer shearing member, cutting elements on said outer shearing member formed by transverse slots having enlarged ends disposed in said front portion and narrow neck portions extending from said enlarged ends into said side wall portion, and cutting elements on said inner cutter formed by V-shaped transverse slots having the narrower end portion thereof disposed beneath the enlarged ends of the slots in said outer shearing member and the wider end portion thereof disposed beneath the neck portions of the slots in said outer shearing member.

2. In a head for dry shavers, the combination of an outer shearing member having a front portion and a side wall portion adjacent thereto, an inner cutter mounted for movement within said outer shearing member and having an outer surface shaped to engage the inner surface of both the front and side wall portions of said outer shearing member, cutting elements on said outer shearing member formed by slots having enlarged ends disposed in said front portion and narrow neck portions extending from said enlarged ends into said side wall portion, and cutting elements on said inner cutter formed by transversely tapered slots having the wider end portion thereof disposed beneath the neck portions of the slots in said outer shearing member.

3. In a head for dry shavers, the combination of an outer shearing member having a longitudinal front portion and a longitudinal side wall portion adjacent thereto, an inner cutter mounted for longitudinal movement within said outer shearing member and having an outer surface shaped to engage the inner surface of both the front and side wall portions of said outer shearing member, cutting elements on said outer shearing member formed by transverse slots having enlarged ends disposed in said front portion and narrow neck portions extending from said enlarged ends into said side wall portion, and cutting elements on said inner cutter formed by transverse slots extending beneath the slots in said outer shearing member.

4. In a head for dry shavers, the combination of an outer shearing member having a longitudinal front portion and a side wall portion adjacent thereto, an inner cutter mounted for longitudinal movement within said outer shearing member and having an outer surface shaped to engage the inner surface of both the front and side wall portions of said outer shearing member, a first series of cutting elements on said outer shearing member formed by transverse slots having enlarged ends disposed in said front portion and reduced neck portions extending therefrom into said side wall portion, a second series of cutting elements on said outer shearing member formed by a longitudinal row of perforations disposed in said front portion, and a series of cutting elements on said inner cutter formed by transversely tapered slots having the narrower end portions thereof disposed beneath said second series of cutting elements on said outer shearing member and having the wider end portions thereof disposed beneath the reduced neck portions of said first series of cutting elements of said outer shearing member.

5. In a head for dry shavers, the combination of an outer shearing member having a looped flange portion, an inner cutter mounted for movement within the looped flange portion of said outer shearing member, a series of cutting elements on said outer shearing member formed by slots extending around the edge of said looped flange portion and having enlarged openings at the ends thereof, and a series of cutting elements on said inner cutter formed by tapered slots having the narrower end portion thereof disposed beneath the enlarged openings at the ends of the slots in said outer shearing member.

6. In a head for dry shavers, the combination of an outer shearing member having a looped flange portion, an inner member having cutting elements formed by spaced slots and mounted for movement within said outer shearing member and between the looped flange portion thereof, a first series of cutting elements on said outer shearing member formed by spaced slots extending around said looped flange portion and having enlarged openings at the ends thereof, a second series of cutting elements on said outer shearing member formed by spaced perforations near one end of the slots forming said first series of cutting elements, a series of openings in said outer shearing member disposed on the opposite side of said looped flange portion from the perforations forming said second series of cutting elements.

JAMES H. RAND, Jr.